US010398138B2

(12) United States Patent
Lampman et al.

(10) Patent No.: US 10,398,138 B2
(45) Date of Patent: Sep. 3, 2019

(54) WILDLIFE EXCLUSION COMPOSITION AND ASSEMBLY

(71) Applicant: Lampman Wildlife Management Services Ltd., Barrie (CA)

(72) Inventors: Richard Lampman, Aylmer (CA); Brad Truelove, Barrie (CA); Todd Sirola, Barrie (CA); Graham Hagens, Hamilton (CA)

(73) Assignee: LAMPMAN WILDLIFE MANAGEMENT SERVICES LIMITED, Barrie (CA)

( * ) Notice: Subject to any disclaimer, the term of this patent is extended or adjusted under 35 U.S.C. 154(b) by 586 days.

(21) Appl. No.: 14/681,781

(22) Filed: Apr. 8, 2015

(65) Prior Publication Data

US 2015/0282471 A1    Oct. 8, 2015

Related U.S. Application Data

(60) Provisional application No. 61/976,728, filed on Apr. 8, 2014.

(51) Int. Cl.
| | |
|---|---|
| *A01M 29/24* | (2011.01) |
| *A01K 3/00* | (2006.01) |
| *A01M 29/30* | (2011.01) |
| *H01B 1/24* | (2006.01) |
| *E01C 11/26* | (2006.01) |

(52) U.S. Cl.
CPC ............. *A01M 29/24* (2013.01); *A01K 3/002* (2013.01); *A01M 29/30* (2013.01); *H01B 1/24* (2013.01); *E01C 11/265* (2013.01)

(58) Field of Classification Search
CPC ....... A01M 28/24; A01K 3/002; A91M 29/30; E01C 11/265
USPC ........................................................ 119/712
See application file for complete search history.

(56) References Cited

U.S. PATENT DOCUMENTS

| | | | |
|---|---|---|---|
| 520,510 A | 5/1894 | Wilson | |
| 1,254,072 A | 1/1918 | Russell | |
| 1,345,145 A * | 6/1920 | Dominguez | A01K 3/002 119/416 |
| 1,406,343 A * | 2/1922 | Carden | A01K 3/002 193/35 R |
| 1,518,772 A * | 12/1924 | Carden | A01K 3/002 256/16 |

(Continued)

FOREIGN PATENT DOCUMENTS

| | | | | |
|---|---|---|---|---|
| CA | 2428585 A1 * | 5/2002 | ............ | E01C 7/182 |
| CH | 528845 A * | 9/1972 | ........... | B65D 88/744 |

(Continued)

*Primary Examiner* — Magdalena Topolski
*Assistant Examiner* — Morgan T Barlow
(74) *Attorney, Agent, or Firm* — Ridout & Maybee LLP

(57) ABSTRACT

An animal exclusion system comprising first and second conductive elements electrically isolated from each other and each having a different electrical potential applied thereto, the first and second conductive elements each comprising carbonaceous particles in a polymeric binder forming a conductive load bearing surface, the load bearing conductive surface of the first conductive element being close enough to the load bearing conductive surface of the second conductive element for both surfaces to simultaneously be in electrical contact with an animal of predetermined size.

17 Claims, 7 Drawing Sheets

(56) References Cited

U.S. PATENT DOCUMENTS

| | | | | |
|---|---|---|---|---|
| 1,618,555 | A * | 2/1927 | Shaw | E01B 17/00 256/16 |
| 1,769,486 | A | 7/1930 | Bjork | |
| 2,790,626 | A * | 4/1957 | Harford | A01K 3/002 256/17 |
| 3,377,462 | A * | 4/1968 | Pferschy | E01C 11/265 219/213 |
| 3,410,977 | A * | 11/1968 | Ando | E01C 11/265 219/213 |
| 3,657,516 | A * | 4/1972 | Fujihara | B65D 88/744 219/213 |
| 3,780,250 | A * | 12/1973 | Ando | E01C 11/265 219/519 |
| 4,387,882 | A * | 6/1983 | Mansour | E01B 17/00 256/17 |
| 4,949,216 | A * | 8/1990 | Djukastein | H05C 1/04 361/232 |
| 4,969,418 | A * | 11/1990 | Jones | A01K 15/023 119/712 |
| 5,460,123 | A * | 10/1995 | Kolz | A01K 79/02 119/220 |
| 5,605,418 | A * | 2/1997 | Watanabe | E01C 11/265 219/528 |
| 5,614,292 | A * | 3/1997 | Saylor | B32B 25/04 428/209 |
| 6,511,258 | B1 * | 1/2003 | Johnsen | E01C 1/005 404/28 |
| 6,519,131 | B1 * | 2/2003 | Beck | A01K 15/04 361/232 |
| 6,817,138 | B1 * | 11/2004 | McGill | A01M 29/26 114/361 |
| 6,827,042 | B1 * | 12/2004 | Riddle | A01K 15/04 119/712 |
| 6,925,748 | B2 * | 8/2005 | McGill | A01M 29/26 43/98 |
| 6,993,867 | B2 * | 2/2006 | Toyota | A01M 19/00 361/232 |
| 7,834,769 | B2 * | 11/2010 | Hinkle | A01M 31/002 119/712 |
| 8,111,164 | B2 * | 2/2012 | Bryce | A01M 31/002 119/712 |
| 8,365,888 | B2 * | 2/2013 | Re Fiorentin | B60L 5/42 191/13 |
| 8,939,110 | B2 * | 1/2015 | Hazlehurst | A01K 3/002 119/712 |
| 2002/0092481 | A1 * | 7/2002 | Spooner | A01K 3/005 119/712 |
| 2004/0195226 | A1 * | 10/2004 | Stabile | E01C 11/265 219/213 |
| 2006/0291837 | A1 * | 12/2006 | Novotny | E01C 11/265 392/478 |
| 2010/0040411 | A1 * | 2/2010 | Cardullo | E01C 9/00 404/79 |
| 2012/0085337 | A1 * | 4/2012 | Chen | E01C 9/00 126/271.1 |
| 2012/0132634 | A1 * | 5/2012 | Song | E01C 11/265 219/203 |
| 2013/0119043 | A1 * | 5/2013 | Consiglio | E01C 11/265 219/213 |
| 2013/0180466 | A1 * | 7/2013 | Brown | A01M 29/10 119/713 |
| 2013/0220233 | A1 | 8/2013 | Lampman et al. | |
| 2016/0230354 | A1 * | 8/2016 | Theodore, Jr. | E04C 2/525 |
| 2016/0355997 | A1 * | 12/2016 | Lewley | E01C 11/26 |

FOREIGN PATENT DOCUMENTS

| | | | | |
|---|---|---|---|---|
| DE | 4219075 A1 | * | 12/1993 | E01C 11/265 |
| GB | 1274197 A | * | 5/1972 | A01K 3/002 |

* cited by examiner

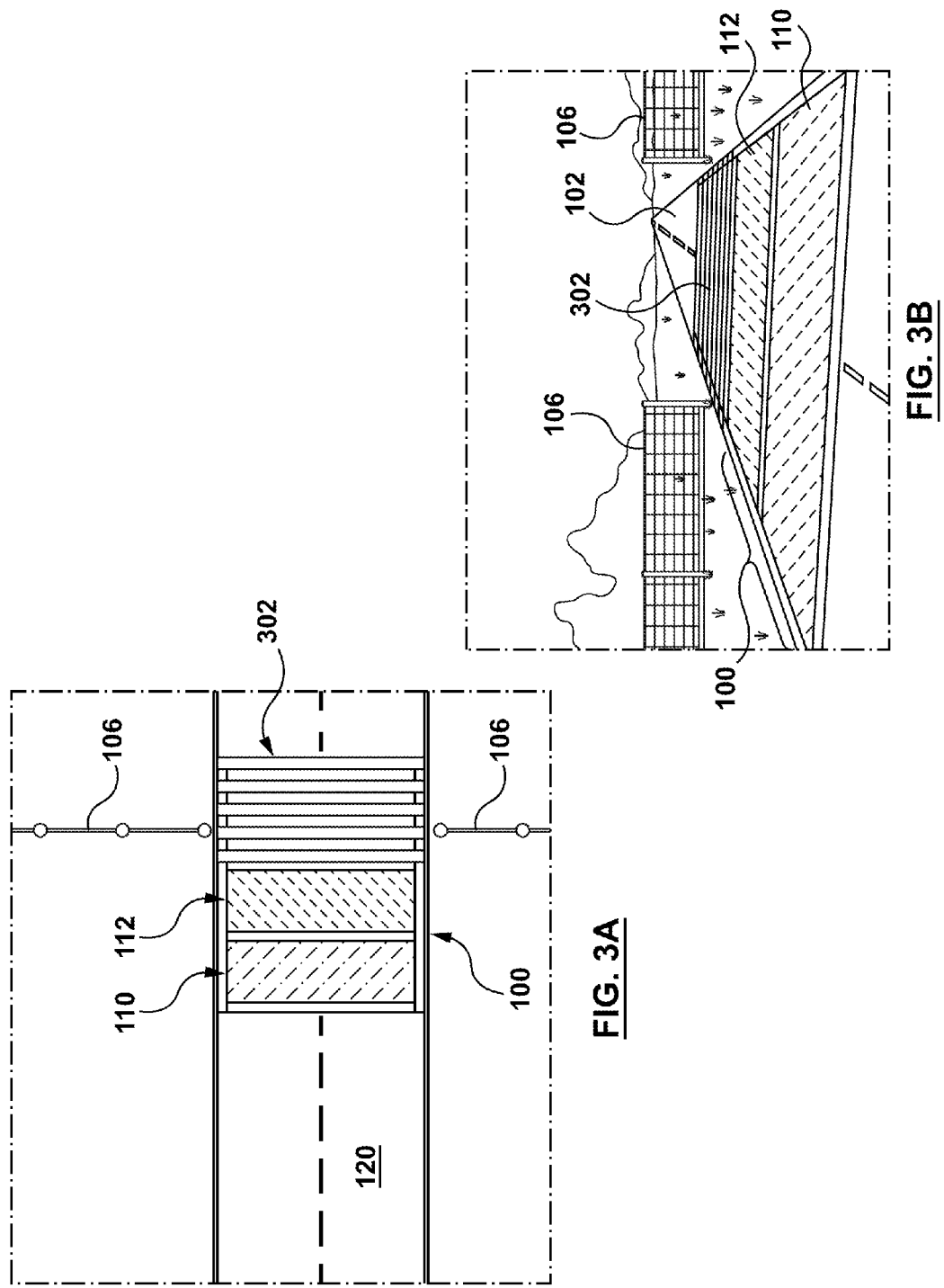

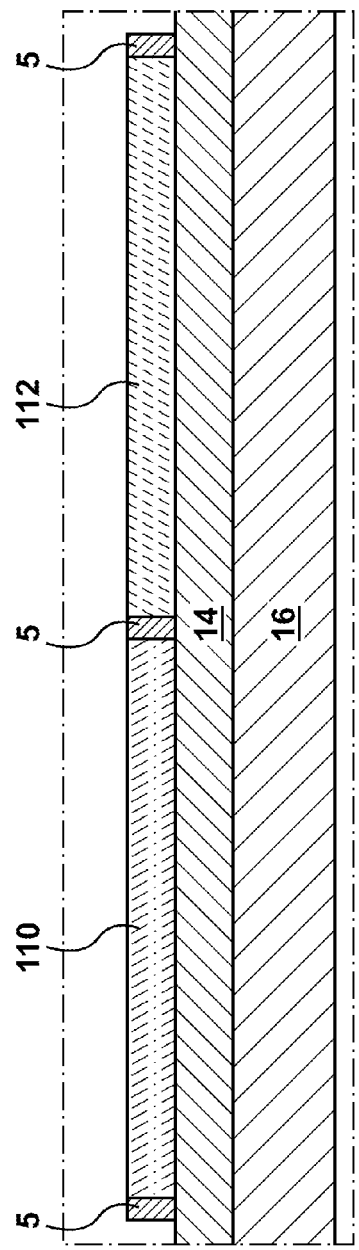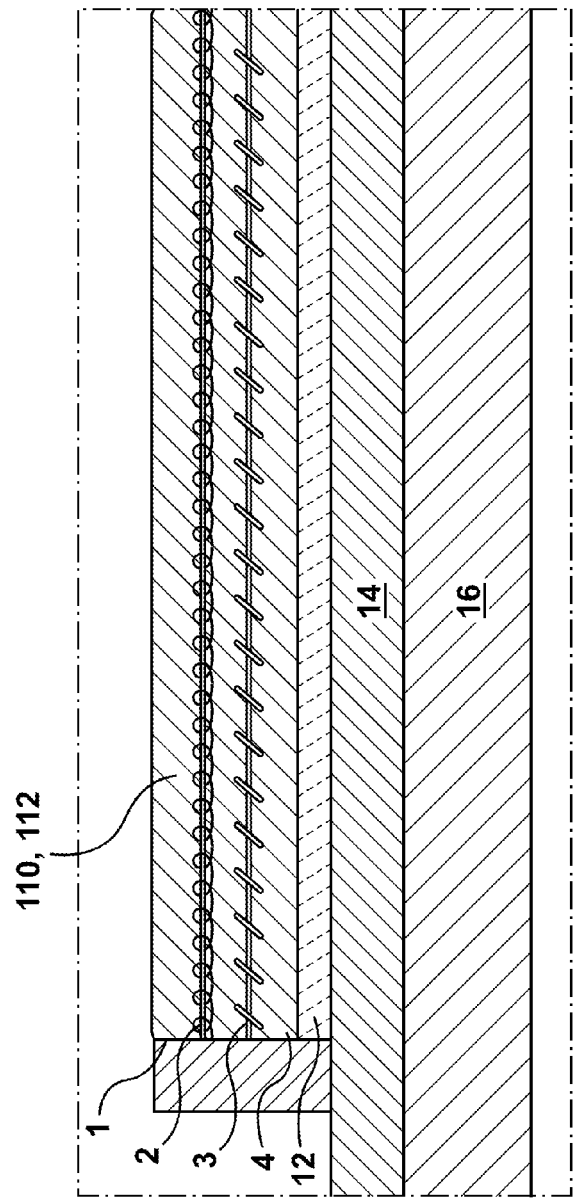

WILDLIFE EXCLUSION COMPOSITION AND ASSEMBLY

This application claims priority to and the benefit of U.S. Patent Application No. 61/976,728 filed Apr. 8, 2014, the contents of which are incorporated herein by reference.

BACKGROUND

This disclosure relates to systems and methods used to control the movement of domestic and wild animals, including systems and methods that make use of electrical conductors. It is known to control the movement of wild and domestic animals by the installation of metallic and non-metallic conductors including electric fences, electrically conductive plates or mats. Prior systems may suffer from a number of shortcomings which include:

I. inflexible installation limited to certain applications and certain target species;
II. difficulty of construction;
III. inability to withstand a wide range of climatic conditions including snow storms or heavy rains;
IV. being prone to corrosion, material decomposition and other decay;
V. the inability to discourage wildlife from attempting to cross conductive elements;
VI. the inability to withstand blunt force impact such as snow plows;
VII. being prone to vandalism and theft of exposed conductive elements; and
VIII. inability to withstand high traffic count, tracked heavy equipment and machinery.

The commercialization of electrically conductive materials for the construction of roads or highways to control animal movement has been severely limited by the high cost and poor physical properties of such compositions. This is because compared to conventional non conductive aggregate, metallic conductors are extremely expensive, while carbonaceous materials are both physically weak, and being semi-conductors must be used at very high concentrations in order to be effective.

It is known to combine electrically conductive elements and materials with various types of binding agents in order to manufacture conductive materials with a wide range of practical functionality. Such products include electrically conductive concrete, such as Conducrete™, water-resistant membranes for the corrosion protection or dispersal of electrical currents of different surfaces, or flexible conductive wires of various types. It is also known to employ a variety of carbonaceous materials such as carbon black, coke breeze, graphitic powder and carbonaceous fines in combination with cementitious or organic polymeric binders for such purposes. It is also known to manufacture electrically conductive compositions with sufficient strength to support the passage of vehicular traffic and heavy equipment and machinery.

Utilization of electrically conductive fences to discourage the movement of domestic and wild animals into prohibited areas is well known. Such installations provide a high voltage, low amperage, shock to discourage animals without inflicting injury. At gaps between such fences required to allow access to vehicles, heavy equipment and machinery, installation of cattle guards of various types have long been known to discourage animals from breaching the fence opening. Crude attempts have been made to electrically charge such cattleguards to improve the repel rate. However, the current technology suffers from numerous shortcomings, including for example the inability to control animals across a wide range of sizes. For example, many of the existing assemblies are not suitable for controlling large agile animals which are capable of by-passing or jumping over such structures, while some animals with large hooves or paws can walk across cattle guards without being affected. On the other hand, systems focused on larger animals do not have sufficient flexibility of design to address the problem of small animals, such as rodents, which might trespass territory inside buildings in order to reach foodstuff.

One of the present inventors, Richard Lampman, has an existing design which is commercially available and is described in US Patent Application Publication No. 2013/0220233 published in August 2013, which teaches connecting exposed brass embedded in composite wood planks to an electric fence energizer to form an electric mat which discourages animals from crossing, and includes warning placards or signage to advise pedestrians.

Electrically charged systems disclosed to date also suffer from shortcomings that the electrical circuits involve earth grounding and that the shock is delivered to the animal's hoof or paw as the electricity takes the path of least resistance.

It is also known to utilize a bi-layer rubber polymer that lies directly on ground, in which the lower layer insulates electricity from ground and the upper layer carries an electric charge which shocks any animal that touches the rubber mat and ground at the same time. The temporary nature and portability of such systems results in limited durability and makes them susceptible to theft and vandalism.

Furthermore, snow can accumulate on top of systems during winter months which permits animals to walk across the assemblage without being shocked. These systems can also be adversely impacted by flooding during spring thaw, or contaminated with detritus, all of which can result in the grid becoming dysfunctional due to various short circuits. Many of the current technologies do not adequately address the fact that such assemblages must be robust enough to handle the high traffic counts, heavy axle weight, movement of heavy tracked equipment and machinery, and withstand the blunt force impact of snow plows in the winter. Existing systems to manage the movement of wildlife do not address the need for heavy vehicles and equipment to cross these electrically charged barriers while the physical consequences of both heavy snow in the winter, and flooding and icing caused by melting snow near these installations reduces the effectiveness and increases the risk of vehicle accidents.

A commercial technology known as 'Gap Zapper'™ utilizes a flexible mat consisting of two layers of rubber in which a proprietary compound applied to the top layer delivers a similar shock as an electrical fence to any animal that makes contact with it, but has insufficient strength to handle regular traffic of heavy vehicles, and has to be temporarily removed to allow tracked heavy equipment to cross. Snow or heavy rain dramatically reduce the effectiveness of the Gap Zapper™. Furthermore, various electrical animal control systems are relatively inflexible structures not easily adaptable to the wide range of types and sizes of wild and domestic animals Systems with exposed metallic conductors can be prone to damage to the exposed conductors. Such systems have sporadic performance due to the impact of earth ground; the delivery of the shock across an animal's hoof or paw as the electrical current takes the path of least resistance and the impact of the snow and rain.

Accordingly, an improved wildlife exclusion system and method could be beneficial in many applications.

SUMMARY

According to an example embodiment there is described an animal exclusion system comprising first and second conductive elements electrically isolated from each other and each having a different electrical potential applied thereto, the first and second conductive elements each comprising carbonaceous particles in a polymeric binder forming a conductive load bearing surface, the load bearing conductive surface of the first conductive element being close enough to the load bearing conductive surface of the second conductive element for both surfaces to simultaneously be in electrical contact with an animal of predetermined size.

According to an example embodiment, there is described a method of providing an animal exclusion system comprising: forming first and second conductive elements each including carbonaceous particles in a polymeric binder, the first and second conductive elements being electrically isolated from each other; and applying different electrical potentials to the first and second conductive elements sufficient to provide a non-lethal electric shock to an animal in simultaneous contact with the first and second conductive elements.

BRIEF DESCRIPTION OF THE DRAWINGS

Reference will now be made, by way of example, to the accompanying drawings which show example embodiments of the present application, and in which:

FIG. 3A is a top view of an animal exclusion system according to another example embodiment;

FIG. 3B is an enlarged perspective view of a portion of FIG. 3A;

FIG. 7A is a cross section of a conductive element of animal exclusion system according to another example embodiment; and FIG. 7B is an enlarged cross section view of a portion of FIG. 6A;

Similar reference numerals may have been used in different figures to denote similar components.

DETAILED DESCRIPTION

Figure 1A:
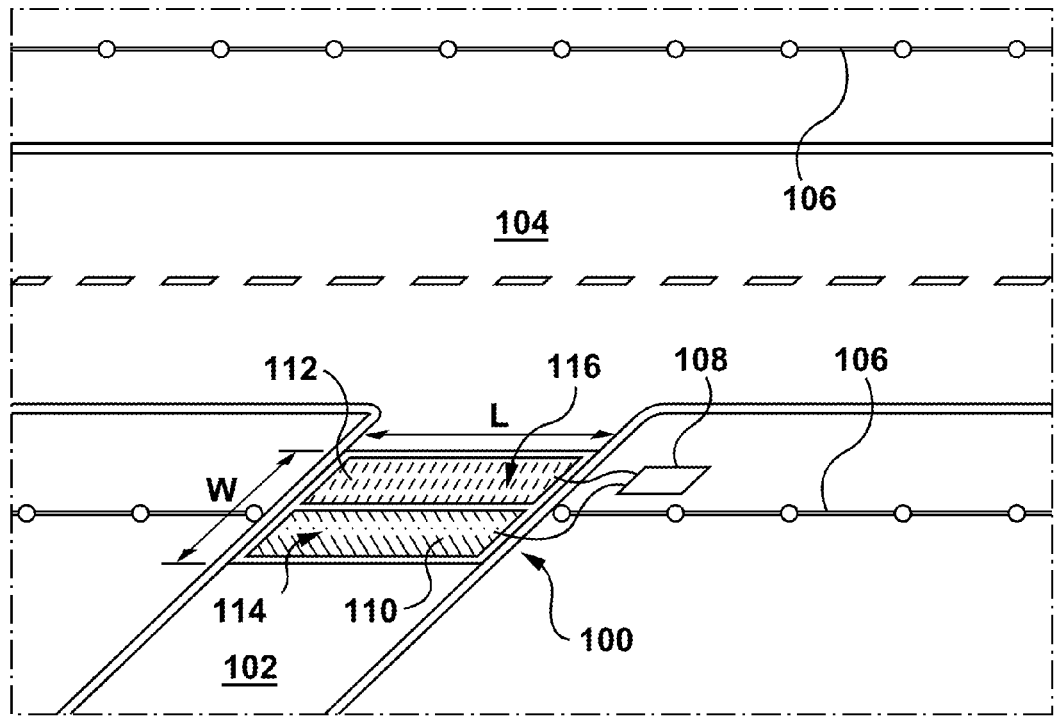
FIG. 1A is a perspective view of an animal exclusion system according to one example embodiment.

According to example embodiments a versatile wildlife exclusion system is provided which includes an electrically conductive and activated roadway capable of bearing vehicular traffic, heavy equipment and machinery, which may be constructed between wildlife impermeable barriers such as a fence, or within domestic domains such as cattle barns or storage sheds, to allow ingress of vehicles, and pedestrians, but prohibit the undesirable movement of wild and or domestic animals or rodents, for both interior and outdoor situations.

Compositions and design of assemblies to discourage various types of animals from entering exclusion areas by means of electrically charged pavement designs consisting of a series of conductive elements are described. Example embodiments may, in at least some applications, describe a low cost, electrically conductive composition with high thermal properties which when cured provides for the construction of a wide range of large and small electrical wildlife exclusion systems.

Depending on the demands, such assemblies can either be designed large and strong enough to bear the weight of heavy wheeled or tracked vehicles, or exceedingly compact in order to prevent ambulatory pests from gaining access to food supplies. Moreover, such installations are compatible with a wide range of safety and convenience features.

As disclosed below in greater detail, in at least some applications, example embodiments of compositions described herein can in at least some applications provide inexpensive non-metallic, high strength electrically conductive plates or pavements. At least some of the following features are present in at least some of the examples embodiments described herein:

(i) Flexibility of design. At least some example embodiments allow for use in a very wide range of installations, from no more than a few square inches in size, to roadways many yards or miles long. This is made possible by the chemical composition of the paving material which is such that after being cast into a mould of variable design at room temperature, the liquid composition cures to the required properties under most weather conditions.

(ii) The casting may optionally be carried out in situ at the utilization location, or at some predetermined manufacturing location.

(iii) Earth isolation: At least some example embodiments avoid reliance on earth grounding by providing insulated negative and positive electrical plates or pads.

(iv) Ease of installation. At least some example embodiments make use of a composition that is designed such that any applicators familiar with constructing pathways, sidewalks, in-ground gates, perimeter boundaries, or roads, highways and other transportation corridors including railways, can form these structures using conventional equipment.

(v) Wide functionality: At least some example embodiments require no special protection from heavy maintenance equipment such as snow plows and tracked vehicles. Such versatility allows for the protection of indoor food bins or very large outdoor spaces among other things.

(vi) Efficiency and speed: At least some example embodiments permit a conductive roadway that, once installed, can be opened to traffic within less than four hours.

(vii) Longevity: At least some example embodiments provide a composition having physical properties that can be adjusted as required to attain the compressive, flexural strengths, and can be designed to meet the SHRP performance criteria for highway performance as required for the climatic conditions encountered in every province or territory in Canada and in every state in the USA. In addition, at least some example embodiments provide increased protection from corrosion.

(viii) Resistant to theft and vandalism: At least some example embodiments embed the conductive elements within rigid composition that would substantially reduce or eliminate the opportunity for theft or vandalism.

(ix) Icing and flood control: at least some sample embodiments provide a composition and electrical installation such that sufficient heat may be generated during operation, that any snow build up during the winter months can be efficiently melted and evaporated. The rate of such melting and evaporation can be controlled in such a way that the surface can be maintained at a nearly dry state throughout the year.

(x) Adhesion to base substrates. Utilization of electrically charged surfaces, pavements or mats to prevent movement of animals, frequently demands that the electrically charged sections be isolated from the earth. The compositions disclosed in at least some example embodiments may provide sufficient adhesion to various insulating materials in order to allow the compositions to be installed on a wide range of pavement or highway substrates such as, optionally, Portland cement based concrete or asphalt paving. In preparation for the installation of the insulating membranes, or conductive coatings, such substrates would be milled, or pre-cast according to methodology known to those skilled in the arts of roadway or highway construction.

According to one example embodiment here described, a wildlife exclusion system includes an electrically conductive arrangement positioned to span across an opening to which is created to allow access to pedestrians, conventional wheeled vehicles, or rail traffic. Example embodiments may in some applications allow the construction of numerous exclusion arrangements by utilizing a composition of sufficient physical functionality and electrical conductivity in a variety of ways. For example, if a road or highway capable of meeting the North American SHRP standards is required, a composition with higher strength or required thickness can be casted to meet the performance criteria. In the case of a small area designed to prevent the passage of animals, while providing access to pedestrians or light traffic, the design would be correspondingly adjusted.

For the purpose of wildlife management at entranceways (for example) to wildlife sanctuaries or vineyards, a pavement arrangement incorporating the conductive elements according to example embodiments will be positioned at the location of any desired entrance or exits or breaks in the exclusionary fence or walled perimeter. The arrangement may include a number of alternating positive and negative conductive paving elements spaced apart from each other to form an exclusion configured to provide an electric shock to wild animals when particular conductive elements within the exclusion area are bridged by a crossing animal.

Figure 1B:
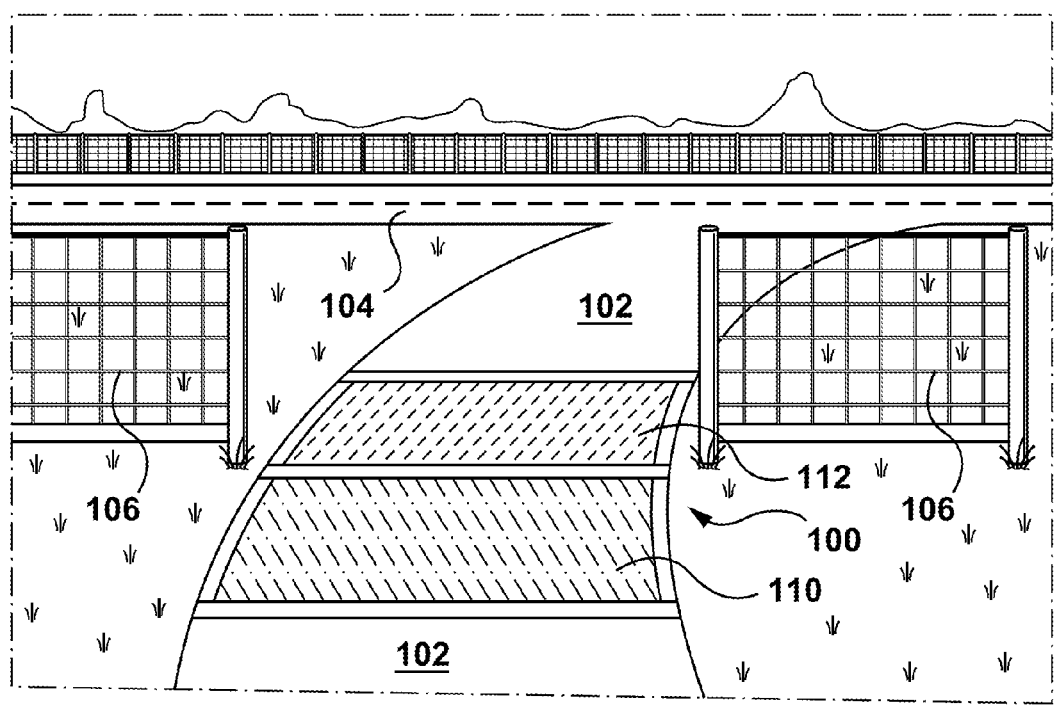
FIG. 1B is an enlarged view of a portion of FIG. 1A.

By way of example, FIGS. 1A and 1B illustrate an example embodiment in which an animal exclusion system 100 is used to provide a barrier at an access ramp 102 to a roadway 104. FIGS. 1A and 1B depicts a typical ramp 102 to a highway corridor that is protected by wildlife fencing 106. The access ramp 102 requires a break in the exclusionary wildlife fencing 106 to allow vehicles to enter or exit the main roadway 104. The placement of the wildlife exclusion system 100 in the roadway at the location of the break in the fence serves as an "in road fence" to maintain the integrity of the wildlife exclusion fencing 106 and prevent animals from entering the highway corridor.

The length L of the wildlife exclusion system 100 will typically be determined by the length of the area that requires protection (for example, the length of the break in the exclusionary fence 106). The width W of the wildlife exclusion system can be made to whatever size or arrangement necessary to bridge (to give just one example) by making the gap between and on either side of barrier fences wide enough to prevent animals from by-passing the system 100, while making its sufficient to prohibit them from leaping over it. In such a manner any design can be optimized in order to manage the movement of different types of wild and/or domestic animals in a great number of ways. The nature of the materials and construction methodology of system 1000, which will be described in greater detail below, enable the exclusionary wildlife system to be subsequently changed enlarged or reconfigured if circumstances warrant.(i.e. the addition of an additional traffic lane or resurfacing). The example system 100 of FIGS. 1A and 1B includes two electrically isolated conductive plates or elements 110, 112 which each have an upper load bearing surface 114, 116 respectively. A power source 108 applies a different polarity to each of the conductive elements 110, 112 such that when an animal comes into simultaneous contact with the upper surfaces 114, 116 of both of the conductive elements the animal will receive a non-lethal electric shock that will deter the animal from continuing to cross the exclusion system 100. By way of example, element 110 may have a negative potential, and element 112 may have a positive potential.

Figure 2A:
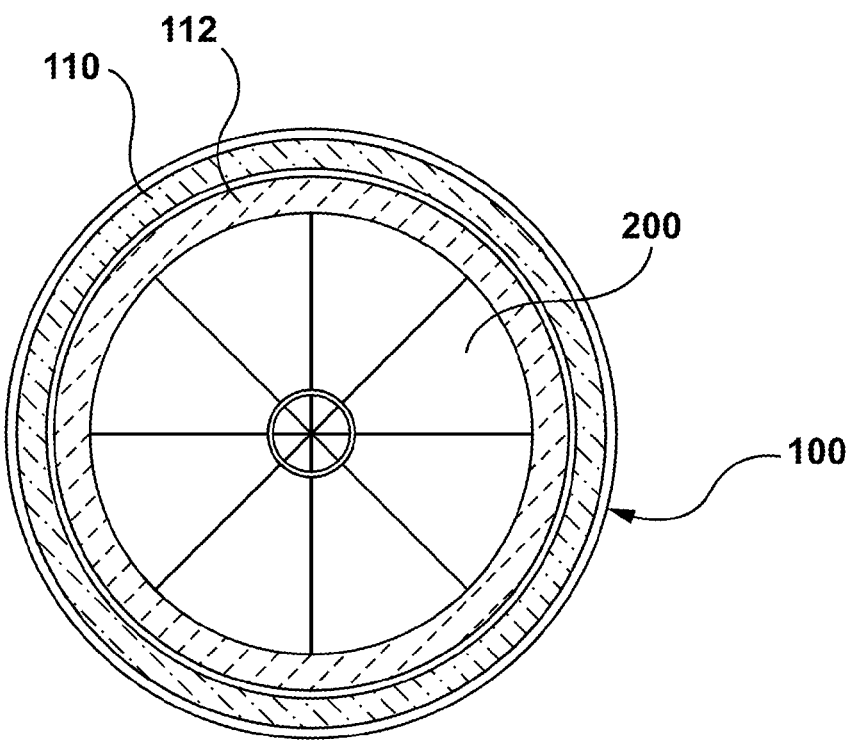
FIG. 2A is a top view of an animal exclusion system according to another example embodiment.
Figure 2B:
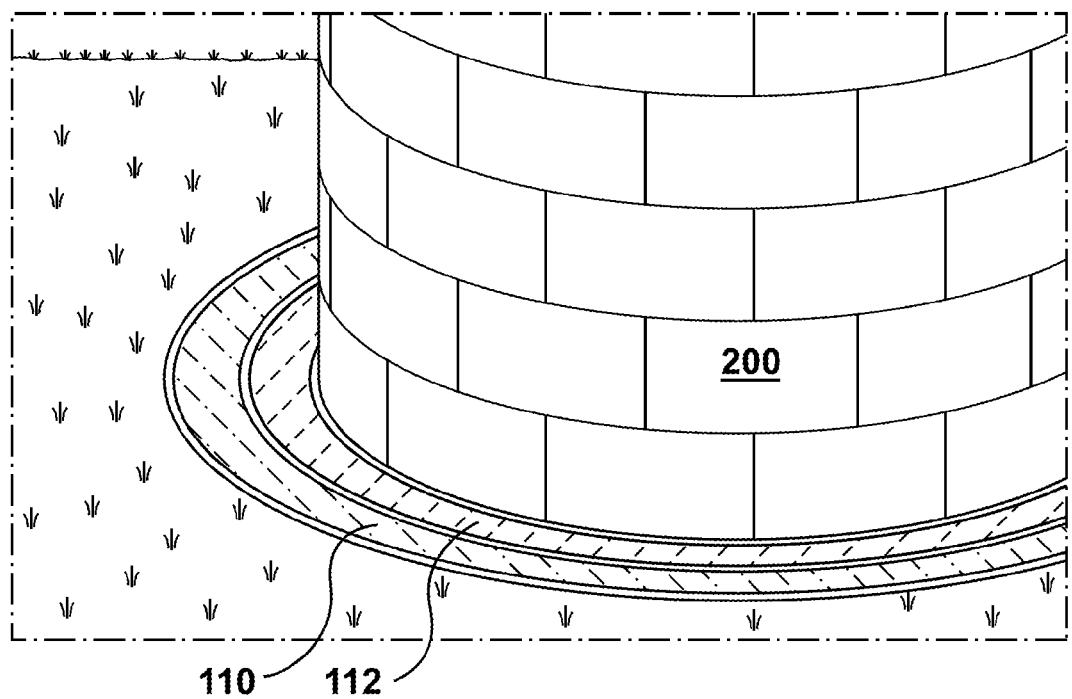
FIG. 2B is an enlarged perspective view of a portion of FIG. 2A.

FIGS. 2A and 2B illustrate another possible application of animal exclusion system 100 in the context of a grain bin 200. FIGS. 2A and 2B depict a typical grain or food storage bin 200. The placement of the wildlife exclusion system 100 around the perimeter would discourage animals and rodents from entering the grain or food storage bin. In the illustrated embodiment, conductive elements 110, 112 are formed as rings of alternating polarity around the base perimeter of the food storage bin 200. The number and width of the conductive element rings 110, 112 constructed around the perimeter of the bin 200 could be varied to prevent a variety of targeted species from entering the bin. Progressively narrower rings 110, 112 would prohibit the smallest of rodents from entering the bin.

FIGS. 3A and 3B illustrate another possible application of an animal exclusion system 100 in the context of a roadway 102 that includes a conventional grate-style cattleguard 302 crossing a roadway 106 to protect a break in an exclusionary fence 106. FIGS. 3A and 3B depict a typical cattle guard 302. It is known that certain species of wildlife can easily cross cattle guards 302 by either leaping across or by walking on the rails. In the illustrated embodiment, an animal exclusion system 100 similar to that described above in respect of FIGS. 1A and 1B is placed in line with existing cattle guard 302 to improve the performance of the cattle guard 302. In addition to preventing animals with larger paws or hoofs from crossing the cattle guards, in at least some applications the electrical magnetic field (EMF) generated by the wildlife exclusion system 100 may discourage some animals from attempting to cross the gap in exclusion fence 106.

Figure 4A:
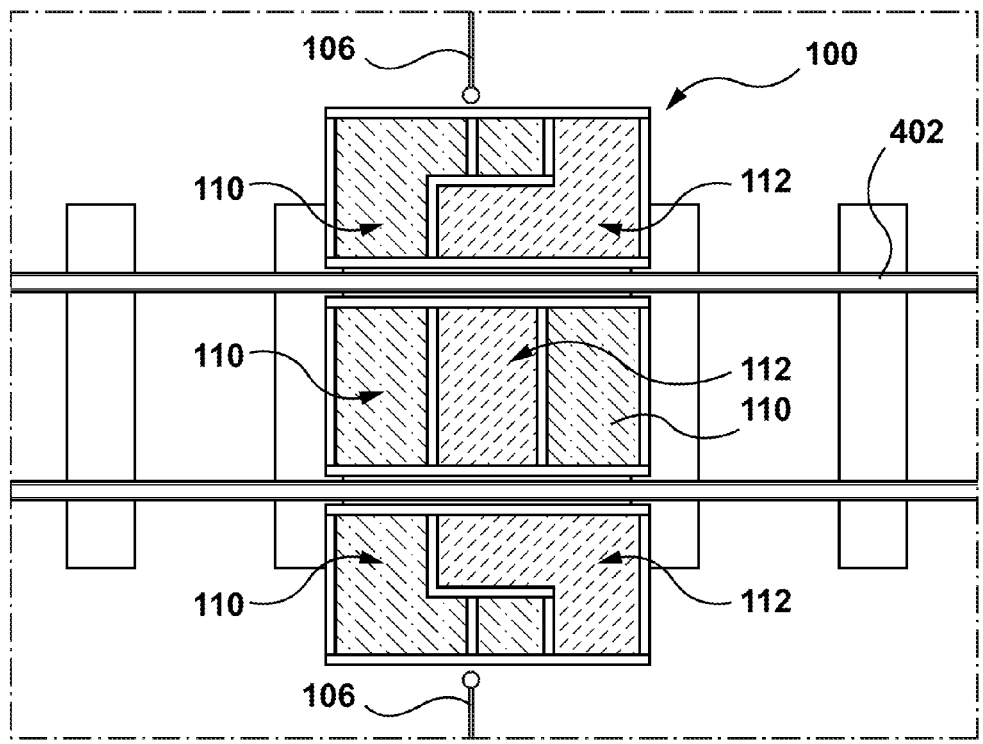
FIG. 4A is a top view of an animal exclusion system according to another example embodiment.
Figure 4B:
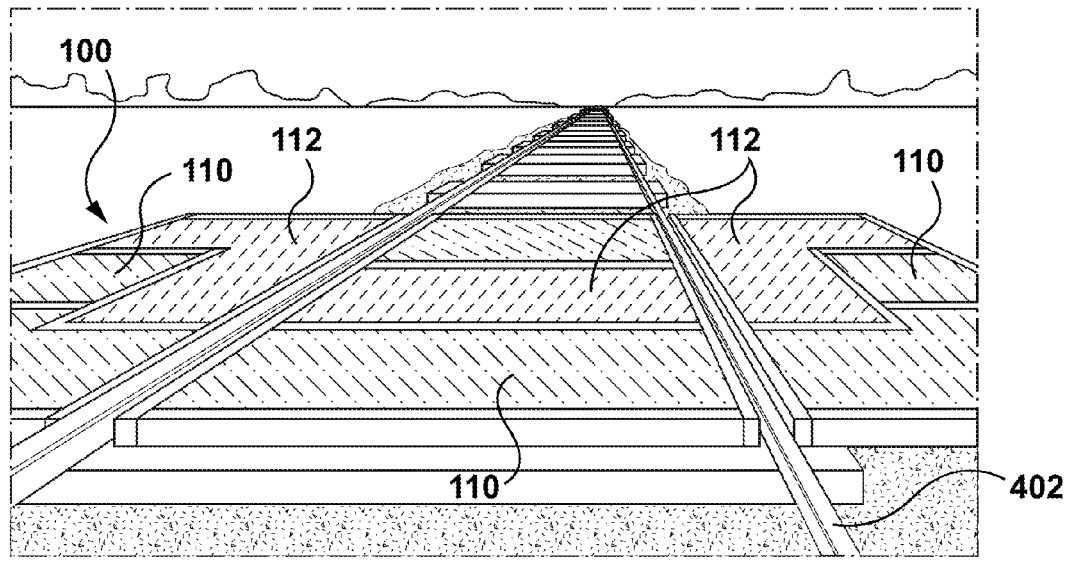
FIG. 4B is an enlarged perspective view of a portion of FIG. 4A.

FIGS. 4A and 4B illustrate another possible application of an animal exclusion system 100 in the context of a railway line 402 that passes through a gap in an exclusionary fence 106. FIG. 4 depicts a typical section of railway 402. Similar to a roadway application, the placement of the wildlife exclusion system 100 perpendicular to the rail tracks is used to deter wildlife and other animals from entering the railway corridor through the gap in exclusionary fence 106. Such a configuration could prevent wildlife from being struck and killed by trains in tunnels, on bridges and in other portions of the railway corridor. As shown in FIGS. 4A and 4B, a configuration of alternating positive and negative polarity elements 110, 112 of different sizes and configurations can be designed to deter a predetermined range of animals of differing sizes.

Figure 5A:
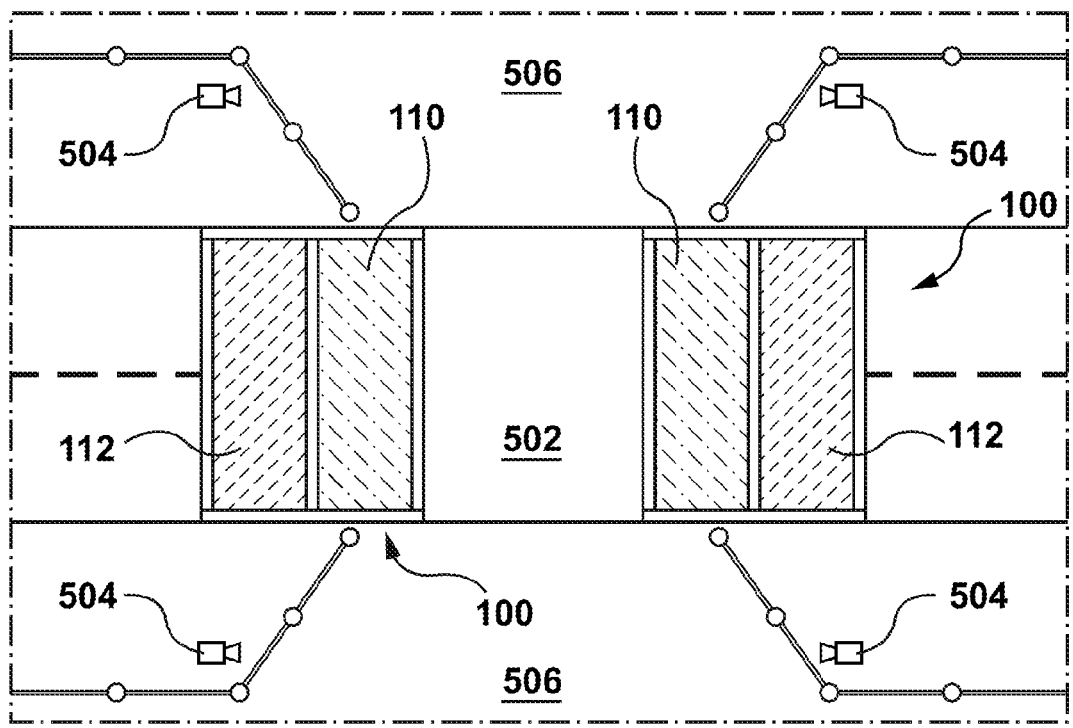
FIG. 5A is a top view of an animal exclusion system according to another example embodiment.
Figure 5B:
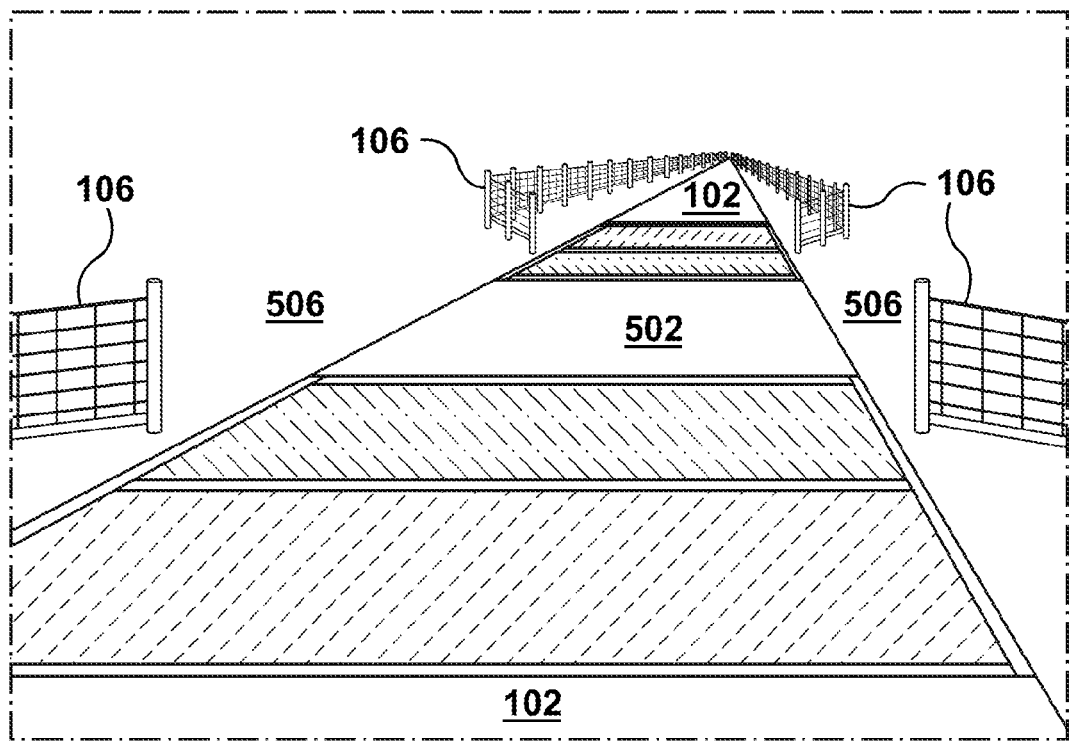
FIG. 5B is an enlarged perspective view of a portion of FIG. 5A.

It is known that wildlife have established migration routes that are increasingly being disrupted by development of our transportation corridors. FIGS. 5A and 5B illustrate an example embodiment of animal exclusion systems 100 used in an "at grade wildlife crossing application" which enables humans and wildlife to safely share the transportation corridors in a cost effective manner compared to specially constructed underpasses or overpasses. The placement of two parallel wildlife exclusion systems 100 (each having a configuration similar to that described in respect of FIGS. 1A and 1B) perpendicular to the roadway 106 would enable wildlife to cross a roadway 106 through crossing zone 502 with reduced risk of the animal becoming trapped within the road corridor which has been protected by wildlife exclusion fencing 106. Currently, in many cases, wildlife exclusion fencing has created "hot spots" or "slaughter zones" where breaks in the fence occur. Furthermore, preventing wildlife from migrating across roadways has numerous adverse biological impacts that may have significant long term impact on the health and survival of particular species of wildlife. The at grade wildlife crossing of FIGS. 5A and 5B could be enhanced by motion detection cameras 504 that would activate lights to warn motorists when animals were in a detection zone 506 that included crossing zone 502. Photo luminescent paint could be incorporated to provide further warning to motorists.

Example embodiments of the wildlife exclusion system herein disclosed can be powered by one of a number of commercially available power sources 108 known to those familiar with the art of electrical techniques for animal control such as the Speed Rite 3000™ energizer. The power source 108 can be powered by mains or solar power. In such installations the power source 108 is selectively coupled to the positive and negative plates or conductive paving elements 112, 110, such that an open circuit may be established between alternating conductive elements 112, 112 of each exclusion arrangement or system 100 which generates a painful but harmless shock when the circuit is completed by an animal stepping on one of the arrangements and bridging conductive elements 110, 112 of the opposite polarity.

The Compositions

Multiple examples of compositions that may in various applications be used to construct the conductive plates or elements 110, 112 will now be described. In example embodiments, the combination of carbon with rigid materials such as asphalt cement or cross-linked polymers are employed for construction of electrically conductive vehicle bearing road paving purposes According to example embodiments, and without limiting the scope of possible application methods, the conductive elements 110, 112 described herein, which may for example be paving elements, consist of or include dispersions of one or more types of particulate carbon such as carbon black, coke breeze, graphitic powder or carbonaceous fines (hereafter 'carbon') dispersed in a load bearing structural matrix. Such matrices may derive from either organic materials (such as thermoplastic or chemically cross-linked polymers), or inorganic materials such as Portland cement in its various forms. Optionally the composition used for the conductive paving elements 110, 112 being described can be manufactured as a hot mix, by blending carbon with bituminous materials or thermoplastic polymers at elevated temperature, after which the composition is poured or compressed into a mould, for shipment after cooling, or applied on site while hot to a prepared road base using processes familiar to those skilled in the art of road construction. Alternatively, the compositions can be prepared by blending carbon with polymeric precursors in liquid form at room temperature, after which the composition can be cast in a mould off site, or applied to a road base using conventional paving technology and allowed to cure in situ.

In this latter procedure, the polymeric precursor can in at least some embodiments either consist of or include water based polymeric dispersion, or a blend of non-aqueous pre-polymers consisting of two or more reactive ingredients. In such cases the uncured material may consist of or include carbon dispersed in liquid carriers such as water or organic solvents or two part chemically cross-linked system according to methods familiar to those skilled in the art of surface coatings. In at least some example embodiments, the binder used to form the composition is thus selected from one or more types of organic polymers, although the use of inorganic cementitious binders may be possible in some configurations.

Examples of a polymeric class providing suitable strength and water permeability in the correct range for use in the preparation of liquid formulations are cross-linked styrene acrylic copolymers, or carboxylated styrene butadiene copolymers, optionally in combination with bituminous emulsions. In addition to having the desired functionality described above, these materials also have the advantage of elasticity and low toxicity both to the environment of polymeric dispersions such as non-ionic, anionic and cationic polychloroprenes, polybutadienes and butadiene acrylonitriles may alternatively be used with varying degrees of performance.

In such example embodiments the binder material used in the composition may include thermoplastic polymers known in the art of flooring such as two part cross linkable polymers such as urethanes or epoxies. Thus in the example embodiments described above, the conductive pavement elements 110, 112 could be installed either in a liquid form at ambient temperature, to be cured relatively slowly by air drying or chemical cross linking, or as a hot melt which cures rapidly on cooling. The rate of curing of such liquid compositions can also be accelerated by application of heat, or incorporation of various accelerating additives specific to the chemistry of the binders. Without limiting the scope of this disclosure, the paving compositions here described can be further modified by inclusion of various types of fillers such as sand, aggregates, rheology modifiers, flexibilizing additives, microbicides, capable of resisting destructive organisms present in the soil, or other functional additives familiar to the art of flooring or highway paving materials.

In at least one example embodiment, the carbon source used to form the composition is a particular type of high purity coke breeze which is characterized by spherical particles with the size range of about 30 to 70 mesh. In the Examples shown below, the choice of polymeric binder, and the ratio of polymer to carbon, are selected to optimally both reduce overall cost, and to provide maximum functionality such as high compressive and flexural strength, resistance to cracking and rutting at low temperatures. In at least some examples, selection of carbon source and binders may allow satisfactory performance properties to be achieved with concentrations of carbon as high as 85-90%. In addition to extending the lifetime of the installation, a higher level of carbon also improves the electrical conductivity of the system. Another of the carbonaceous materials of particular interest is graphite, which due to its exceptionally high thermal conductivity can be used to enhance the thermal conductivity of the system, that being of value to facilitate the melting and evaporation of snow or ice during time of inclement weather.

Similarly various other bituminous or other carbonaceous materials or fillers commonly used in the construction of pavements and pathways could be used to partially replace the conductive carbonaceous materials if the cost and/or rheology restrictions so require.

While many inorganic binders such as Portland cement, ground blast furnace slag, and organic binders such as polybutadiene, polychloroprene, ethyl vinyl acetates and polyacrylic ester, to name just a few, may be used to prepare such compositions, examples of binders capable of providing sufficient performance criteria required for highway conditions are two part compositions based on urethane (cross-linked amino-diisocyanate complexes) or epoxy (crosslinked amino-bisphenol A diglycidal ether complexes) chemistry. In such two component compositions the starting material bisphenol diglycidal ether, is commonly known as Epoxy, Part A, while the diisocyanate starting material is described as Urethane Part A. A wide range of polyamines, polyamidoamines and/or polyols exist to provide the necessary performance criteria of the finished product. Optionally the composition can be enhanced with a wide range of additives well known in the field of epoxide membranes and coating materials. Among the many materials known in the art may be mentioned rheology modifiers, curing accelerators and flexibilizers and antimicrobial additives to name but a few.

In example embodiments, carbon is combined with a polymeric binder to form a material composition that has electrical and physical properties suitable for the applications cited. The present description describes the application of various combinations of carbon and binders which yield products with the following performance characteristics in some example applications:
(i) electrical resistivity between 20 and 5,000 $\Omega$-cm (and in some cases, up to 25,000 $\Omega$-cm)
(ii) water resistance better than $10^{-5}$ cm/second
(iii) sufficient compressive and flexural strength, rutting and cracking resistance among other standard performance specifications demanded by the vehicular traffic anticipated for a particular situation, for example with a compressive strength of between 3000 and 6000 pounds per square inch (PSI).

In order to achieve such properties example compositions may contain:
Carbon: 50-80% by weight
Epoxy Part A: 0-30%
Epoxy Part B: 0-10%
Bitumen: 0-30%
Urethane Part A: 0-30%
Urethane Part B: 0-10%
Inert mineral fillers: 0-30%

As described above in respect of FIGS. 1A,1B; 3A, 3B, and 5A,5B, in example embodiments for a roadway, conductive elements 110, 112 formed from the compositions described above may be configured to extend either parallel or perpendicular to the direction of the roadway as determined by the overall engineering design of the roadway. Accordingly, an electrical potential may be established between the groups of alternating conductive elements 110, 112.

In at least some example embodiments, when the system 100 is activated, bridging the gap between adjacent conductive elements 110, 112, or any two conductive elements of opposite polarity, will close a circuit and produce a painful but harmless electric shock of high voltage in the ~1 to 10 kilovolt range, yet of very low amperage, and of relatively short duration, to deter animals from crossing the system 100.

In example embodiments, the systems 100 here described may be activated periodically in a pulsed manner by power source 108 with the pulses occurring with a frequency that is selected to provide electric pulsing shocks to targeted wildlife over the extended duration that is expected for such wildlife to reasonably traverse the exclusion system 100. Similarly, in some embodiments, both the frequency and intensity of the shock may be adjustable, and varied according to the type of wildlife that is to be excluded.

It is also recognized that as a result of the very high voltage associated with this system coupled with the fact that a large surface area of the system is conductive, a relatively strong electromagnetic field (EMF) will be created. In at least some applications, such a feature can provide a deterrent without actual animal contact as it is known that at least some animals have a high degree of sensitivity to EMF radiation. Evidence from the field suggests that wildlife sense EMF and resist coming in direct contact with EMF emitting structures 100 even when feed motivation is present.

As will be appreciated from the systems described above in respect of FIGS. 1A, 1B; 3A, 3B; and 5A, 5B, example embodiments of the system 100 may span across an opening in the form of modular components or conductive elements 110, 112 such as for example spaced-apart abutting modular slabs. In an example embodiment, each modular slab or conductive paving element is constructed of a rigid electrically conductive composite of sufficient strength to meet the requirements of vehicular traffic, heavy equipment and machinery across the opening. In one example, the vehicular traffic runs perpendicular to a fence line and the opening is provided at a location where the roadway for vehicular traffic passes through the fence line.

While it may be appreciated that many different arrangements may be envisioned, it is beneficial to provide an arrangement that closely abuts or interfaces with the roadway or exclusionary fence to form a comprehensive exclusion area, such as for example, an exclusion mat, platform, or pavement, which serves as an effective obstruction to the movement of animals.

In an example embodiment, each modular conductive element 110, 112 is formed from the above described composition and takes the form of a plate. In one example embodiment, multiple modular plates 110, 112 are used to form an animal exclusion zone at a pedestrian or vehicular crossing, with adjacent plates having opposite charges. The electrical conductivity of adjacent plate and the magnitude of the applied current is such as to produce an electrical shock when the open circuit is completed. In an example embodiment, the power source is capable of generating a voltage of sufficient magnitude that when the circuit between two adjacent plates is closed (as a result of contact of both plates simultaneously with an animal) an electrical discharge involving very high voltage and low amperage sufficient to startle, but not harm the animal occurs. In an example embodiment, the dimensions of the two plates 110, 112 are such that an animal attempting to traverse the crossing cannot avoid placing at least two feet on the barrier assembly, one being on the positive and the other on the negative plate simultaneously. It will be appreciated that various designs of the conductive plates can be envisaged within the context of this embodiment.

Additional plates/conductive elements 110, 112 can be installed in order to extend the length of an exclusion zone or shorten the distance between the conductive plates/elements depending upon the expected stride length of the targeted species. In some situations, it may be preferable to incorporate a series of alternating positive and negative plates or elements 110, 112 in decreasing width to address the site specific conditions and to accommodate the requirement to control a variety of species. In one non-limiting example, six 8'×4' plates are envisaged, each separated from the next by means of an insulating barrier, and the configuration of the electrical connections is such that adjacent plates are either positive or negative.

In example embodiments, the system 100 is incorporated a multilayered vehicular pavement, roadway, or highway, constructed upon a base layer. This base level or layer consists of a pavement designed according to the requirements of road and highway construction with sufficient strength and/or flexibility to withstand the passage of such vehicular traffic as may traverse the area. The planar conductive elements or plates 110, 112 form a surface layer above the base layer and are positioned to not interfere with the flow of vehicular traffic, and constructed with sufficient care to withstand accidental damage by wildlife. In example embodiments, an intermediate insulating layer is included between the surface layer and the base layer. The base layer may for example be embedded in a road surface prepared with the normal gradation and compaction of aggregate familiar to those skilled in the art of road or highway construction, and engineered to conform to the transportation requirements as defined by regional, state or provincial authorities, such as Departments or Ministries of Transportation. In example embodiments, an intermediate insulating layer is included between the surface layer and the base layer.

Figure 6A:
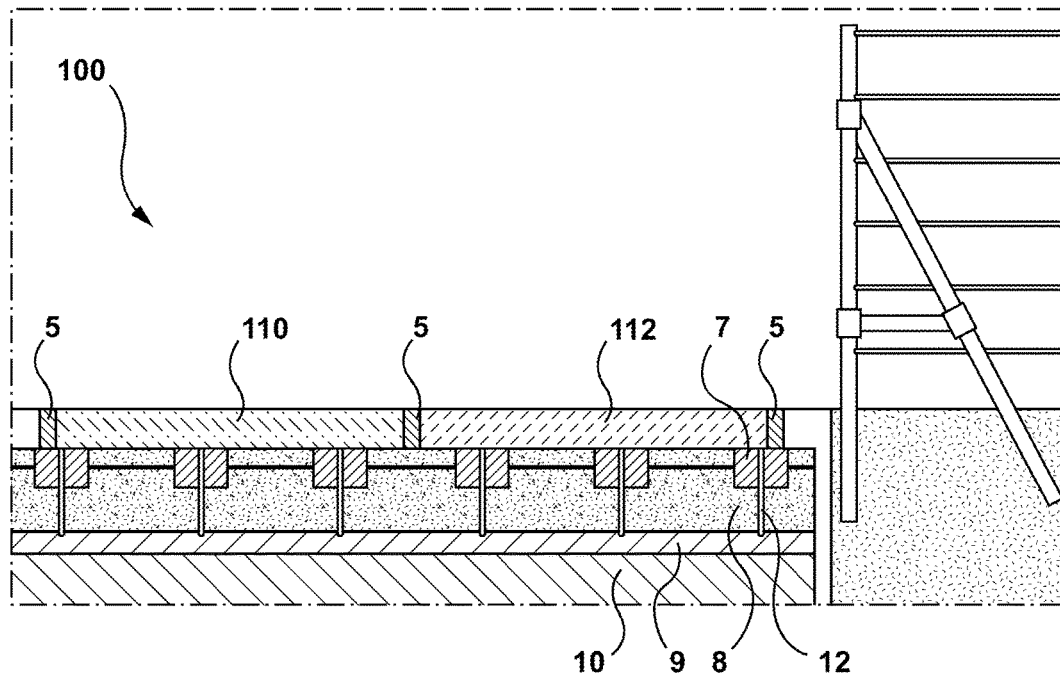
FIG. 6A is a cross section of a conductive element of animal exclusion system according to one example embodiment.
Figure 6B:
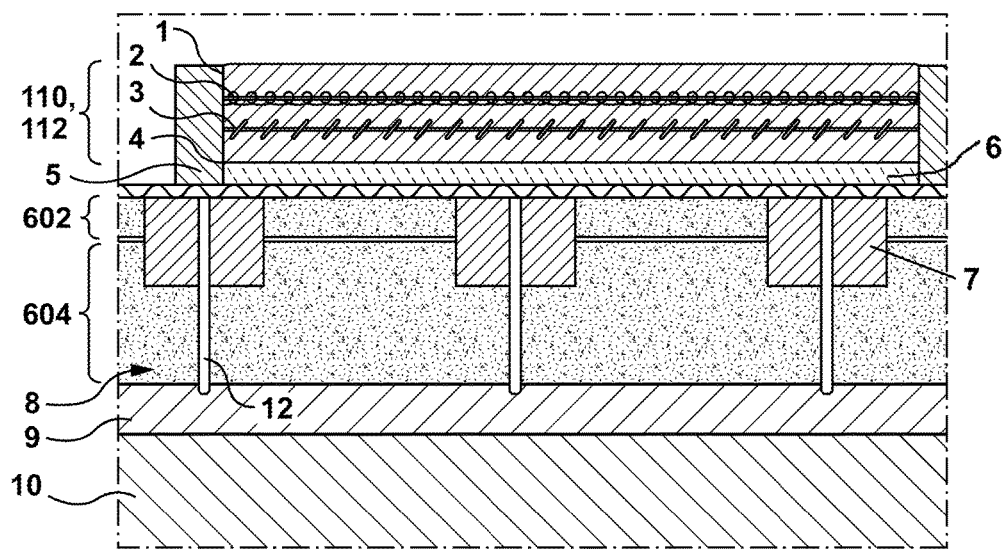
FIG. 6B is an enlarged cross section view of a portion of FIG. 6A.

FIGS. 6A and 6B illustrate cross-sectional views of an installed exclusion system 100 according to example embodiments. The system 100 includes a surface layer formed from negative and positive conductive elements 110, 112, an insulating layer 602 and a lower base layer 604 on top of existing road base 9 and subgrade 10. In the example of FIGS. 6A and 6B, the conductive elements 110, 112 each include multiple components or sub-layers and have a depth selected to meet site specific conditions and desired technical specifications. In an example embodiment the conductive elements 110, 112 each include components/sub-layers. In particular, after installation, the conductive elements 110, 112 each include a top layer 1 formed from the conductive composition described above. Top layer 1 provides a load bearing conductive surface that forms a portion of the roadway and contours to the existing roadway.

In an example embodiment, the conductive plate elements 110, 112 include an embedded reinforcement/heating system layer 2. The optional reinforcement/heating system layer 2 may for example include wire, rod, mesh or other heating system elements encased within the conductive plate material in order to increase both the strength and electrical conductivity of the elements 110, 112 and, in at least some cases, provide a heating function. In at least some embodiments, the heating system layer 2 is powered by system power source 108 and generates sufficient heat to prevent snow and freezing rain from accumulating on the top surface of the conductive plate elements 110, 112. The thermal properties of the conductive plate elements 110, 112 and the application of consistent energy will result in the melt water evaporating on the conductive plate elements. In example embodiments, one or more conductors 3 are also encased in the conductive plate elements 110, 112 and are electrically connected by wiring to the energizer power source 108 to electrically charge the conductive plate elements 110, 112. The negative plate 110 is wired to the negative side of the power source 108 and the positive plate 112 is wired to the positive side of the power source 108. The use of embedded conductors 3 can mitigate against corrosion, material decay, theft or vandalism of the conductor. The conductor 3 may also serves to increase the structural strength of the conductive plate. The application of a potential through conductors 3, in combination with the conductive nature of the plate material results in the entire plate elements 110, 112 (the full surface area and throughout the full depth) being conductive. Accordingly, the performance of the conductive plate elements 110, 112 will not be adversely impacted by cracks or chips in the plate or by vandals attempting to recover metal.

The conductive plate elements 110, 112 include a bottom layer 4 that serves to fully encase the conductor 3 and optional reinforcement/heating system 2.

Each plate element 110, 112 is electrically isolated from its surrounding environment (and in particular each other and earth ground) by an insulating layer 602 that includes one or more layers of insulating material. In an example embodiment, the insulating layer 602 includes a frame 5 that forms an insulating perimeter barrier around the vertical side edges of the conductive element 110, 112. The frame 5 may for example be formed from non conductive plastic lumber. The insulating layer 602 also includes a horizontal membrane 6 of insulating material such as a rubber or plastic plate or mat or membrane that is positioned under the bottom layer 4 of the conductive plat element 110, 112. Accordingly, frame 5 and membrane 6 collectively isolate all surfaces of the conductive element 110, 112, with the exception of the upper facing load bearing surface of top layer 1.

In at least some example embodiments, the conductive plate elements 110, 112 and their associated insulating layers 602 is supported by a base layer 604 that includes a structural framework 7 that secures the upper layers to a foundation that is constructed within the existing road foundation 9. The structural framework 7, which can include vertically extending anchor pins and support members, is placed and anchored in the existing road foundation 9, 10 and is secured and supported by backfill such as cement 8 with the normal gradation and compaction of aggregate familiar to those skilled in the art of road or highway construction, and engineered to conform to the transportation requirements as defined by regional, state or provincial authorities, such as Departments or Ministries of Transportation.

In at least some example embodiments frame 5 and membrane 6 function as a structural form for in-situ installation of the uncured composition that forms conductive elements 110, 112.

Alternative installation methods can be employed to provide an exclusion system 100. In this regard, FIGS. 7A and 7B show an alternative installation configuration in which a number of the components and layers of the embodiment of FIGS. 6A and 6B are omitted. In particular, in the embodiment of FIGS. 7A and 7B, the conductive plate elements 110, 112 are bonded to the existing asphalt 14 using an insulating binding agent 12. Similar to methodology utilized by those skilled in the art of resurfacing asphalt roads or highways resurfacing, a layer of asphalt is removed by cutting, milling or scraping. A bonding agent 12 with strong insulating properties is applied to the remaining asphalt before the bottom layer 4 of the conductive plate element 110, 112 is installed. In such a configuration the rubber membrane 6 and base layer 202 discussed above are omitted.

In one embodiment of the exclusion arrangement 100 consists of at least two, but conceptually as many as may be required, generally planar plate elements 110, 112 formed from the conductive composition described above with sufficient length to extend between the opposite sides of the roadway, and a combined width sufficient to prevent wildlife from traversing the assembly The planar surfaces of the plate elements 110, 112 form a top layer of a pavement construction of sufficient strength to support vehicular, heavy equipment and machinery traffic. In a non-limiting example embodiment the dimension of each of the two rectangular plate elements 110, 112 is eight feet (8') by four feet (4'), the length being designed to precisely comply with an 8' width of the roadway between fence posts. The plates elements 110, 112 are positioned side by side such that their 8' lengths, and the dividing gap between the plates, are parallel to the fence line. Consequently the combined width of the assembly 100 perpendicular to the fence line (and parallel to the roadway) is a little more than 8' (including an insulated gap between the plates). The plate elements 110, 112 are positioned in such a way that the gap between the plate elements is sufficient to permit installation of a non-conductive material with sufficient strength and flexibility to function as a vehicular pavement. This separating insulator might therefore be constructed from such materials as high strength plastic, concrete, wood or asphaltic hot mix. While the length of this gap is not precisely defined, it could for example be between about 1 and 6 inches.

Although the embodiments described above included exclusion arrangements having conductive elements which extend longitudinally from one end of the arrangement to the other, it is appreciated that other configurations are possible, such as, for example, horizontally extending conductive elements, a crisscross or lattice pattern of conductive elements, or other arrangements and combinations of the same. For example, in one embodiment, an exclusion arrangement may be provided which combines longitudinally extending conductive elements running parallel to the road in a region near the road, and horizontally extending conductive elements running perpendicular to the road in other regions of the exclusion arrangement. Further, although embodiments are described as including groups of conductive elements which alternate polarity over a width of the arrangement, it is appreciated that the conductive elements may be grouped differently. Irrespective of the positioning of the conductive elements it is beneficial to position and arrange the conductive elements so that an animal is expected to touch both the negative and positive polarity when stepping on the arrangement, thus receiving a painful but harmless shock.

In an example embodiment, the conductive plate elements 110, 112 are manufactured off site to the required specifications, and positioned in place by means of equipment as techniques known in the art of pavement construction. Alternatively, the conductive elements 110, 112 can be formed in place by pouring and or rolling a liquid precursor using common roadway construction methods, after which the precursor can be cured in place as described in the Examples given below.

Furthermore, one or more power sources 108 may be electrically coupled to the exclusion arrangements to supply power for shocking animals stepping on the arrangements. The power source may be a battery, mains power, and/or solar power or any alternative power source. The power source may be coupled to the conductive elements 110, 112 of the exclusion system 100 arrangements and include a presence detector (such as cameras 504) to selectively activate the conductive elements 110, 112 in response to the presence of wild animals.

Thus, in this manner the exclusion system 100 may remain in a non-energized state when animals are not detected in the vicinity, thereby conserving energy. In addition the exclusion system 100 may include sensors such that it can be automatically deactivated during fault conditions such as an unexpected breach of the circuit due to floodwater or high snow levels. Accordingly the systems provide particularly versatile and efficient devices for excluding wild animals from travelling into undesired or restricted areas. The detection system may further be configured to generate at least one of a control signal and a warning signal in response to detection of wild animals in the vicinity of the exclusion arrangement.

As illustrated in the Examples below, compositions containing from 60-90% spherical coke breeze, from 10-20% epoxy prepared by admixing approximately 3 parts by weight of bisphenol A epoxy, with 1 part by weight of an aminated curing agent, and from 0-20% bitumen, yields a composition which in its uncured form is a powder readily capable of being poured and formed by either manually mixed, applied and compacted (by means of such tools as rakes, and manual compressive rollers), or by means of mechanical augurs and rollers familiar to the art of pavement construction and repair, in order to form conductive elements 110, 112.

As noted above, in example embodiments, conductive elements 110, 112 (which may for example be formed as slabs or plates) may further include one or more metallic wires, rods or mesh in order to increase both the strength and electrical conductivity of the system. The exclusion system 100 may be constructed so as to be removed in modular sections for road repair and maintenance activity in the area occupied by the arrangement, and then reinstalled when road maintenance is complete. In this manner, the arrangement provides a particularly unobtrusive system for preventing wild animals from travelling along the tracks or from entering restricted areas.

As noted above, in example embodiments the exclusion system 100 also includes an insulating layer 602 or 12 of sufficient strength, dielectric strength, and thickness to effectively isolate the charged conductive elements 110, 112 from the ground. As described, such insulating layer may either includes an adhesive insulating membrane which might be cast on site prior to placement of the other pieces of the assembly, or it might encompass a preformed insulating membrane (such as a rubber mat) which might be bonded in place by means of one or more commercially available adhesives.

The exclusion system 100 may also have a safety mechanism to prevent damaging short circuits if the assembly is subjected to water or other breaches of the circuit. The system 100 described herein may be active all the time or turned on or off according to needs. The exclusion system may be manually activated and deactivated with a switch, or automatically activated and deactivated with a timer or sensors that detect other operational parameters. As another example, the system 100 may be deactivated by a sensor if an animal is trapped on the roadway corridor and needs to escape. Sensors may also be configured to detect the movement of animals and vehicles on the roadway. In addition sensors may be used to detect operating conditions of the exclusion system 100, including operational parameters of the power source thereof. Still further, sensors may be used to detect night or day, temperature and humidity conditions with which to monitor and control the system.

Still further, gates may be provided to temporarily close the corridor between the exclusion arrangements and prevent animals from crossing the corridor at this location. The gates may have various designs known to the art, and manually or automatically operated, thus prevent the movement of animals for whatever reason temporary closure of the roadway is required. The system 100 may also contain a heating system 2 in the form of implanted metallic wire, rods or mesh electrical resistors which may be connected to the power source 108 for the purpose of providing enough auxiliary heat to melt excessive quantities of snow or ice. Alternatively as illustrated in Example 8 below, however, in some embodiments, the electrical resistance of the composition used to from elements 110, 112 and amperage of the system 100 can be manipulated to generate sufficient heat to both melt and completely dissipate and snow or ice which might become deposited during the winter months. Such dissipation is effected by the well known Joule effect, according to which the quantity of heat generated by the passage of an electrical current is described by the equation: $Q = k \cdot t \cdot R \cdot I^2$, where Q (expressed as Joules, or British Thermal Units) is the quantity of heat, k is a constant, t is time, R is the electrical resistance (ohms), and I is the amperage.

As illustrated in examples 3 and 6 below, the resistance of the composition can be manipulated as required by modifying the formulation, and the ability of the system to generate heat can also be managed by varying the amperage, within the constraint of not harming the wildlife. Furthermore, the amount of heat being transmitted to the surface of the elements 110, 112 can be increased as required by incorporation of graphite into the formulation, that allotrope of carbon having a thermal conductivity 100 times higher than carbon black or coke breeze.

EXAMPLES

In the following section, certain specific details are set forth to provide a thorough understanding of various disclosed embodiments. However, one skilled in the relevant art will recognize that embodiments may be practiced without one or more of these specific details. In other instances, well known structures and techniques associated with wildlife exclusion and wildlife monitoring systems and methods may not be shown or described in detail to avoid unnecessarily obscuring descriptions of the embodiments.

Example 1

Manufacturing Instructions

The information below provides specific manufacturing instructions for at least some of the example embodiments referred to in the text above:

Step 1: Preparation of the primary mixer for the composition used to form conductive elements 110, 112:

A 5 liter Hobart mixer was charged with 600 grams of spherical coke breeze grade 251 (Asbury Carbons, Asbury N.J., USA, hereafter 'Coke 251'), and 300 grams of Barnes 49 silica sand (Orca Minerals, Waterdown, ON, Canada, hereafter 'Barnes'), and mixed at low speed for two minutes.

Step 2: Preparation of the premix:

To a 1 liter beaker on a hot plate was added 60 grams of the curing agent (Epoxy Part B), Jeffamine D-400 (Huntsman Intl., Woodlands Tex., USA), and 100 grams 58-20 grade asphalt cement (Coco Paving, Downsview, ON, Canada, hereafter, '58-28'). With a laboratory mixer running the temperature was raised to 159° F., and the components were stirred until the bitumen was fully dissolved, at which point the mixture was cooled to 85° F. and 240 grams of Dow epoxy 331 (Dow Chemical Company, Midland Mich., USA, hereafter Dow 331), was added and the mixing continued for 2 minutes.

Step 3: Preparation of the sample:

Immediately after preparation, the 400 grams of premix was transferred to the Hobart mixer, and the sample was thoroughly mixed with the Coke 251 for 3 minutes, after which it was transferred to a rectangular mould of appropriate size. The sample was then uniformly compacted to a pressure of about 10 pounds/square inch. After 2 days curing at room temperature (70-75° F.), the sample was found to have a compressive strength of 3000 pounds per square inch.

Example 2

Electrical Conductivity

The electrical conductivities of a number exemplars prepared according to the procedure in Example 1, and using various ingredients are given in Table 1. The samples consisted of cylinder 4" high, and 2" in diameter. Components include several combinations of carbon sources, mineral fillers (here represented by Barnes sand) and bitumen, and commercially available bis-phenol epoxies and curing agents. The electrical resistance of these various exemplars is given in the right hand column of the table.

Identification of Components:

'KER 828' refers to Epoxy Resin grade KER 828, Kumho P&B Chemicals, Seoul, Korea 'D-230' and 'D-400' refer to epoxy curing agents Jeffamine D-230 and D-400 (Huntsman Intl., Woodlands Tex., USA) respectively.

'Resinlab A' and 'B' refer respectively to Epoxy and Curing agents EP parts A and B, marketed by Resinlab, Germantown, Wis., USA.

'Eponan' refers to Epoxy Resin from Na Ya Plastics Corp, Taiwan 'Oxbow' refers to <200 mesh carbon particulate from Oxbow LLC, Pittsburgh, Pa., USA.

TABLE 1

| Ingredients Sample i.d. | Coke 251 | Oxbow | Barnes | Dow 331 | KER 828 | Eponan | Resin-Lab A | Resin Lab B | Jeff 230 | Jeff 400 | Resistance (Ω-cm) |
|---|---|---|---|---|---|---|---|---|---|---|---|
| 3/12-I | 70 | | | | 22.5 | | | | | 7.5 | 1700 |
| 3/12-II | 80 | | | | 15 | | | | | 5 | 300 |
| 3/12-III | 30 | 30 | | 30 | | | | | | 10 | 800 |

TABLE 1-continued

| Ingredients Sample i.d. | Coke 251 | Oxbow | Barnes | Dow 331 | KER 828 | Eponan | Resin-Lab A | Resin Lab B | Jeff 230 | Jeff 400 | Resistance (Ω-cm) |
|---|---|---|---|---|---|---|---|---|---|---|---|
| 3/12-VII  |    | 60 |    |    |    |    | 30 | 10 |    |     | 20000 |
| 3/12-VIII | 60 |    |    | 20 | 15 |    |    |    |    | 5   | 35000 |
| 3/14-I    | 68 |    |    |    |    | 24 |    | 8  |    |     | 3000  |
| 3/16-I    | 60 |    |    | 25 | 11.2 |  |    |    |    | 3.8 | 1000  |

Example 3

Compressive Strength

This section provides information on the range of compressive strengths provided by different exemplar formulas. The compressive strengths of a number exemplars using similar sized samples and method used in Example 2, and using various ingredients are given in Table 2. The degree of cure is indicated by the compressive strength in pounds per square inch (PSI). The strength values were determined on 250 ml cylinders using a Schmidt model RL test hammer, and the results presented in the far right hand columns were obtained using two curing regimes. The second last column data were obtained by testing samples which had been cured for two days at ambient temperature, while (70° F.) while those in the last column were subjected to a temperature of 120° F.) for another four days.

to as 'GE-36.' The flex angle refers to the degree to which an extended sample can deviate from the horizon when stressed at 70° F.

TABLE 3

| Formula | Ingredients | | | | |
|---|---|---|---|---|---|
|  | Coke 251 | Eponan | Jeff 230 | GE 36 | Flex angle |
| 4/1-I   | 80 | 15   | 5   | 0  | <1° |
| 4/1-II  | 76 | 14.3 | 4.7 | 5  | 3°  |
| 4/1-III | 72 | 13.5 | 4.5 | 10 | 33° |
| 4/1-IV  | 64 | 12   | 4   | 20 | 43° |

TABLE 2

| Ingredients Formula | Coke 251 | Oxbow | 58-28 | Barnes | Dow 331 | KER 828 | Eponan | Resin-Lab A | Resin-Lab B | Jeff 230 | Jeff 400 | PSI 70° F. | PSI 120° F. |
|---|---|---|---|---|---|---|---|---|---|---|---|---|---|
| 3/12-I    | 70 |    |    |    |      | 22.5 |    |      |     | 7.5 |     | 3800 | 5600 |
| 3/12-II   | 80 |    |    |    |      | 15   |    |      |     | 5   |     | 4750 | 6000 |
| 3/12-III  | 30 | 30 |    |    | 30   |      |    |      |     | 10  |     | 1500 | 4800 |
| 3/12-IV   | 55 |    | 5  |    | 30   |      |    |      |     | 10  |     | 3300 | 5400 |
| 3/12-V    | 60 |    |    |    |      |      |    | 30   | 10  |     |     | 3200 | 5500 |
| 3/12-VI   | 60 |    | 10 |    |      |      |    | 22.5 | 7.5 |     |     | 6600 | 6600 |
| 3/12-VII  |    | 60 |    |    |      |      |    | 30   | 10  |     |     | 2600 | 3700 |
| 3/12-VIII | 60 |    |    | 20 |      | 15   |    |      |     |     | 5   | 3200 | 3700 |
| 3/12-IX   | 75 |    |    |    |      |      |    | 18.7 | 6.3 |     |     | 5000 | 6000 |
| 3/12-X    | 65 |    |    |    |      |      |    | 26.2 | 8.8 |     |     | 4500 | 6200 |
| 3/12-XI   | 55 |    |    |    |      |      |    | 33.8 | 11.2|     |     | 6000 | 6000 |
| 3/14-I    | 68 |    |    |    |      |      | 24 |      | 8   |     |     | 3000 | 5300 |
| 3/16-I    | 60 |    |    |    | 25   | 11.2 |    |      |     |     | 3.8 | n/a  | 2800 |

Example 4

Flexibility

This section provides information on the variation in flexibility made possible by different exemplar formulas made possible by inclusion of commercially available flexibilizing agents. The exemplars make use of the flexibilizer is Erisys GE 36 CVC Thermoset Speciality Chemicals Inc., (Emerald Materials, Moorestown, N.J., USA), here referred

Example 5

Rapid Cure Formulas—by Heat

This section demonstrates the methodology by which different exemplar formulas are enabled to cure to sufficient strength to support vehicular traffic after 4 hours. Unlike the case of the curing of sample 3/14-I illustrated in Table 2, the exemplar in Table 4 was cured from the outset at 120° F., which procedure takes advantage of the exothermic heat generated by the epoxy curing process. Once again the degree of cure is indicated by the compressive strength in PSI

TABLE 4

| Ingredients Formula | Coke 251 | Eponan | Resinlab B | From Table 2 70° F., two days | From Table 2 70° F. two days + 120° F. five days | Example 4 120° F., four hours |
|---|---|---|---|---|---|---|
| 3/14-I | 68 | 24 | 8 | 3000 PSI | 5300 PSI | 4500 PSI |

Example 6

Rapid Cure Formulas—by Accelerator

Because of the risk of flash setting, utilization of chemical accelerators may be preferred over thermal acceleration. In Tables 5 and 6, 'F11' refers to the commercial accelerator Versamine F11, (BASF Corp, Vandalia II, USA) and illustrates the results obtained when curing four different combinations of carbon, epoxies and F11 at 70° F.

TABLE 5

| Ingredients | Coke 251 | Barnes | KER 828 | Jeff 400 | F-11 | Resistance Ω-cm |
|---|---|---|---|---|---|---|
| 3/16-I | 60 | 25 | 11.2 | 3.8 | 0 | 1000 |
| 3/16-II | 60 | 30 | 7.5 | 2.5 | 0 | 1500 |
| 3/16-IV | 60 | 30 | 7.6 | 2.5 | 2.4 | 1500 |
| 3/12-V | 55 | 35 | 7.6 | 2.5 | 2.4 | 20000 |
| 3/12-VI | 60 | 25 | 10.3 | 3.4 | 1.3 | 700 |

In Table 6 the condition of the samples is referred to either qualitatively as 'soft' or as PSI when hard enough to register using the Schmidt Hammer, after curing for the number of hours shown at 70° F.

TABLE 6

| Hours cured | 3/16-I | 3/16-II | 3/16-IV | 3/16-V | 3/16-VI | Note |
|---|---|---|---|---|---|---|
| 1.7 | Soft | Soft | Soft | Soft | 1600 PSI | VI warm |
| 1.5 | Soft | Soft | Soft | Soft | 4500 PSI | VI warm |
| 3.3 | Soft | Soft | | <100 PSI | 800 PSI | 4500 PSI VI cooling |
| 7 | Soft | Soft | | <100 PSI | 800 PSI | 4300 PSI |
| 9 | Soft | Soft | | 900 PSI | 2000 PSI | 4100 PSI |
| 33 | 400 PSI | 300 PSI | | 1200 PSI | 3600 PSI | 4800 PSI |

Example 7

Water Resistance

Table 7 provides information on the variation in water absorption made possible by different exemplar formulas. Testing was carried out according to European test protocol EN-1062, data presentation units modified to cm/second, 24 hours.

TABLE 7

| Ingredients | Coke 251 | Oxbow | Barnes | 58-28 | Dow 331 | KER 828 | Eponan | Resin-Lab A | Resin Lab B | Jeff 230 | AbsorpTion cm/sec |
|---|---|---|---|---|---|---|---|---|---|---|---|
| 3/12-I | 70 | | | | | 22.5 | | | | 7.5 | $1.23 * 10^{-8}$ |
| 3/12-II | 80 | | | | | 15 | | | | 5 | $3.27 * 10^{-7}$ |
| 3/12-III | 30 | 30 | | | 30 | | | | | 10 | $2.00 * 10^{-8}$ |
| 3/12-IV | 55 | | | 5 | | 30 | | | | 10 | $1.39 * 10^{-8}$ |
| 3/12-VI | 60 | | | 10 | | | | 22.5 | 7.5 | | $1.46 * 10^{-8}$ |
| 3/12-VI | 70 | | | | | | | 22.5 | 7.5 | | $1.27 * 10^{-8}$ |
| 3/12-VII | | 60 | | | | | | 30 | 10 | | $8.90 * 10^{-9}$ |
| 3/12-VIII | 60 | | 20 | | | 15 | | | | 5 | $1.09 * 10^{-7}$ |
| 3/12-IX AB | 75 | | | | | | | 18.7 | 6.3 | | $1.88 * 10^{-8}$ |
| 3/12-X | 65 | | | | | | | 26.2 | 8.8 | | $1.24 * 10^{-8}$ |
| 3/12-XI | 55 | | | | | | | 33.8 | 11.2 | | $1.61 * 10^{-8}$ |

Example 8

Heat Generation

This section provides information on the ability of different exemplar formulas to generate sufficient heat to melt snow and ice. Copper wires were inserted into opposite ends of two sample of formula 3/16-II (see Table 5) and 3/14-I (Table 4). A potential of 30.6 volts was applied, and the amperage and temperature recorded. In both cases the starting temperature was 70° C.

In the case of 3/16-II the temperature stabilized at 115° F. after 30 minutes, with a current flow of 0.077 amps (i.e. 400Ω). With 3/14-I the temperature stabilized at 130° F. after 70 minutes with a current of 0.120 amps, 260Ω).

Example 9

Freeze Thaw Performance

Two samples were ~2" (5 cm) sections cut from a 4" (10 cm) diameter×8" cylinder prepared using the method in Example 1, and consisting of Coke 251 (85%), Dow 331 (11.2) and Jeff 230 (3.8) and cured at 70° F. for 10 days, were subjected to 50 freeze thaw cycles, after which time their appearance and compressive strengths were compared to control section of similar size from the same cylinder.

After 50 cycles the sample weights had increase slightly as expected (Table 7), and on drying it was found that both samples had lost 5.5% in total dry weight, due to some ingredients dissolving in the water. The physical consequence of this loss appears, however, to be minimal. The compressive strengths of the two samples did not differ statistically from that of the control which was not subjected to freeze thaw cycles being 4800±600 PSI, and the electrical resistance of the tested and control samples were statistically identical, at 70±30 Ω-cm.

Certain adaptations and modifications of the described embodiments can be made. Therefore, the above discussed embodiments are considered to be illustrative and not restrictive.

What is claimed is:

1. An animal exclusion system comprising:
a first conductive element and a second conductive element positioned side by side, wherein
each of the first conductive element and the second conductive element comprises:
an electrically conductive composition comprising carbonaceous particles in a polymeric binder forming a conductive load bearing surface, and
a conductor encased within the electrically conductive composition below the conductive load bearing surface such that the conductor is not exposed at the load bearing surface;
the first conductive element and the second conductive element are electrically isolated from each other and earth ground;
a power source connected to apply a first electrical potential to the conductor of the first conductive element and a second electrical potential to the conductor of the second conductive element; and
the load bearing conductive surface of the first conductive element being close enough to the load bearing conductive surface of the second conductive element for both surfaces to simultaneously be in electrical contact with an animal of predetermined size.

2. The system of claim 1 wherein the first and second conductive elements each is formed from a dispersion of one or more types of particulate carbon dispersed in a load bearing structural matrix.

3. The system of claim 2 wherein the one or more types of particulate carbon includes one or more selected from the group of carbon black, coke breeze, graphitic powder or carbonaceous fines.

4. The system of claim 2 wherein each of the load bearing structural matrices is formed from organic materials including thermoplastic or chemically cross-linked polymers.

5. The system of claim 2 wherein the dispersion comprises:
Carbon 50-80% by weight
Epoxy Part A: 0-30%
Epoxy Part B: 0-10%
Bitumen: 0-30%
Urethane Part A: 0-30%
Urethane Part B: 0-10%
Inert mineral fillers: 0-30%.

6. The system of claim 1 comprising:
a section of a roadway for motor vehicles, the conductive load bearing surface of the first conductive element forming a first portion of a surface of the roadway and the conductive load bearing surface of the second conductive element forming a second portion of the surface of the roadway.

7. The system of claim 1 wherein the conductive elements are each positioned within an insulating barrier which electrically insulates the conductive elements from ground and from each other.

8. The system of claim 6 wherein the section of roadway comprises an asphalt layer, and the electrically conductive compositions of the conductive elements are each bonded to the asphalt layer of the roadway.

9. The system of claim 8 wherein the electrically conductive compositions of the conductive elements are each bonded to the asphalt layer of the roadway by an insulating bonding agent.

10. The system of claim 7 wherein the insulating barrier includes a physical membrane that has been installed underneath each conductive element.

11. The system of claim 7 wherein the insulating barrier includes insulating boards extending around a perimeter of each conductive element.

12. The system of claim 1 wherein the conductive elements have an integrated heating system configured to mitigate buildup of snow or ice on the load bearing conductive surface thereof.

13. The system of claim 1 wherein the conductive elements are configured to generate EM fields of sufficient magnitude to be detected by animals within a proximity of, but without physical contact with, the conductive elements.

14. The system of claim 1 wherein the conductive elements are arranged as rings about a perimeter of the base of a structure to deter entry of animals into the structure.

15. The system of claim 1 wherein:
the first and second conductive elements are configured to provide a non-lethal electric shock to the animal when the animal is in simultaneous contact with the first and second conductive elements.

16. The system of claim 15 wherein the first and second conductive elements are formed by pouring a dispersion comprising the carbonaceous particles and polymeric binder for each of the conductive elements in a forming region and curing the poured dispersion to form a rigid load bearing surface.

17. The system of claim 16 wherein an electrically insulating barrier is located between the conductive elements and earth ground.

* * * * *